United States Patent
Zhao

(10) Patent No.: US 11,318,866 B2
(45) Date of Patent: May 3, 2022

(54) BACKREST LOCKING MECHANISM AND CHILD SAFETY SEAT THEREWITH

(71) Applicant: Wonderland Switzerland AG, Steinhausen (CH)

(72) Inventor: Guang-Hui Zhao, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/028,992

(22) Filed: Sep. 22, 2020

(65) Prior Publication Data

US 2021/0094448 A1 Apr. 1, 2021

(30) Foreign Application Priority Data

Sep. 26, 2019 (CN) .......................... 201910916546.4

(51) Int. Cl.
*B60N 2/28* (2006.01)
*B60N 2/90* (2018.01)

(52) U.S. Cl.
CPC ........... *B60N 2/2866* (2013.01); *B60N 2/919* (2018.02); *B60N 2002/952* (2018.02)

(58) Field of Classification Search
CPC .... B60N 2/2821; B60N 2/2866; B60N 2/919; B60N 2002/952
USPC .................................................. 297/256.16
See application file for complete search history.

(56) References Cited

U.S. PATENT DOCUMENTS

| 7,871,124 | B1 | 1/2011 | Hinds | |
|---|---|---|---|---|
| 8,226,164 | B2 * | 7/2012 | Chen | B60N 2/2866 297/256.16 X |
| 2010/0060055 | A1 * | 3/2010 | Chen | B60N 2/2821 297/256.11 |
| 2018/0050615 | A1 | 2/2018 | Genoway | |
| 2021/0053471 | A1 * | 2/2021 | Shellenberger | B60N 2/286 |

FOREIGN PATENT DOCUMENTS

| CN | 107128220 A | 9/2017 |
|---|---|---|
| GB | 2534456 A | 7/2016 |
| TW | 201623045 A | 7/2016 |

OTHER PUBLICATIONS

"International Search Report" dated Dec. 2, 2020 for International application No. PCT/EP2020/076518, International filing date:Sep. 23, 2020.

* cited by examiner

*Primary Examiner* — Rodney B White
(74) *Attorney, Agent, or Firm* — Winston Hsu

(57) ABSTRACT

A backrest locking mechanism is adapted for a backrest and a base of a child safety seat. The backrest is detachably connected to the base, and the backrest locking mechanism includes a locking pin, a locking component and an operating component. The locking pin is disposed on one of the backrest and the base. The locking component is disposed on another one of the backrest and the base. A locking hole structure is formed on the locking component. The locking pin is configured to detachably engage with the locking hole structure. The operating component is movably disposed on the backrest or the base. The operating component drives the locking pin and the locking hole structure to engage with or disengage from each other when the operating component is operated.

17 Claims, 10 Drawing Sheets

BACKREST LOCKING MECHANISM AND CHILD SAFETY SEAT THEREWITH

BACKGROUND OF THE INVENTION

1. Field of the Invention

The present invention relates to a child product, and more specifically, to a backrest locking mechanism which has simple structure and capability of easy and convenient attachment and detachment of a backrest and a base, and a child safety seat therewith.

2. Description of the Prior Art

A child safety seat is an apparatus which can be installed on a vehicle for securing a child. When an emergency brake or an accident happens, a shell of the child safety seat can absorb a shock to reduce an impact force acting on the child, and a restraining device of the child safety seat can restrain a movement of the child's body, so as to prevent injury of the child for ensuring the child's safety.

The child safety seat usually includes a base, a backrest connected to the base, and a headrest connected to the backrest. For easy package, transportation and storage, the backrest can be configured to be detachable from the base, and the child safety seat further includes a locking mechanism for allowing or restraining detachment of the backrest from the base. However, structure of the conventional locking mechanism is complicated, and operation of the conventional locking mechanism is not user-friendly. Therefore, improvement of the conventional locking mechanism is urgently desired.

SUMMARY OF THE INVENTION

It is an objective of the present invention to provide a backrest locking mechanism which has simple structure and capability of easy and convenient attachment and detachment of a backrest and a base, and a child safety seat therewith for solving the aforementioned problems.

In order to achieve the aforementioned objective, the present invention discloses a backrest locking mechanism adapted for a backrest and a base of a child safety seat. The backrest is detachably connected to the base, and the backrest locking mechanism includes a locking pin, a locking component and an operating component. The locking pin is disposed on one of the backrest and the base. The locking component is disposed on another one of the backrest and the base. A locking hole structure is formed on the locking component. The locking pin is configured to detachably engage with the locking hole structure. The operating component is movably disposed on the backrest or the base. The operating component drives the locking pin and the locking hole structure to engage with or disengage from each other when the operating component is operated.

According to an embodiment of the present invention, one of the locking component and the locking pin is retractable and extendable.

According to an embodiment of the present invention, the operating component is connected to the one of the locking component and the locking pin and configured to drive the one of the locking component and the locking pin to retract or extend.

According to an embodiment of the present invention, the operating component is a pressing component, a sliding component or a rotating component.

According to an embodiment of the present invention, the backrest locking mechanism further includes a recovering component connected to the operating component. The recovering component is resiliently deformed when the operating component is operated, and the resiliently deformed recovering component driving the operating component to recover.

According to an embodiment of the present invention, the operating component is slidable between a first position and a second position. The locking pin and the locking hole structure engage with each other when the operating component is located at the first position. The operating component drives the locking pin and the locking hole structure to disengage from each other when the operating component slides from the first position to the second position, and the recovering component biases the operating component to slide from the second position to the first position.

According to an embodiment of the present invention, the locking component is fixedly connected to the operating component and slidable along with the operating component. The locking component includes a locking plate extending along a direction perpendicular to a longitudinal direction of the locking pin, and the locking hole structure is formed on the locking plate.

According to an embodiment of the present invention, the locking component further includes a connecting arm fixedly connected to the locking plate and the operating component for being driven by the operating component, and an included angle is formed between the connecting arm and the locking plate.

According to an embodiment of the present invention, a positioning protrusion protrudes from a lateral portion of the operating component, and an end of the recovering component sheathes the positioning protrusion and abuts against the operating component.

According to an embodiment of the present invention, a sliding direction of the operating component is parallel to a longitudinal direction of the locking pin, and the recovering component and the locking pin are located at two opposite sides of the operating component.

According to an embodiment of the present invention, an operating recess is formed on an end of the operating component exposed out of the backrest or the base.

According to an embodiment of the present invention, a ball head protrudes from an end of the locking pin adjacent to the locking component, and an outer diameter of the ball head is greater than an outer diameter of the locking pin.

In order to achieve the aforementioned objective, the present invention discloses a child safety seat. The child safety seat includes a base, a backrest and a backrest locking mechanism. The backrest is detachably connected to the base. The backrest locking mechanism includes at least one locking pin, at least one locking component and at least one operating component. The at least one locking pin is disposed on one of the backrest and the base. The at least one locking component is disposed on another one of the backrest and the base. A locking hole structure is formed on the at least one locking component. The at least one locking pin is configured to detachably engage with the locking hole structure. The at least one operating component is movably disposed on the backrest or the base. The at least one operating component drives the at least one locking pin and the locking hole structure to engage with or disengage from each other when the at least one operating component is operated.

According to an embodiment of the present invention, at least one mounting arm protrudes from a lower end of the backrest. At least one guiding slot is formed on the base. The at least one mounting arm is at least partially accommodated inside the at least one guiding slot and slidable relative to the at least one guiding slot. The at least one locking pin is disposed on the at least one mounting arm. The at least one locking component is partially located inside the at least one guiding slot, and the at least one locking pin and the locking hole structure engages with each other when the at least one mounting arm is at least partially accommodated inside the at least one guiding slot.

According to an embodiment of the present invention, the at least one locking component includes a connecting arm and a locking plate connected to the connecting arm. An included angle is formed between the connecting arm and the locking plate. The connecting arm is slidably disposed on the base. The locking plate is located inside the at least one guiding slot. The locking hole structure is formed on the locking plate, and the at least one locking pin is fixedly connected to the at least one mounting arm and protrudes from a lateral wall of the at least one mounting arm for engaging with the locking hole structure.

According to an embodiment of the present invention, at least one sliding hole is formed on the base. The at least one operating component is at least partially accommodated inside the at least one sliding hole and slidable relative to the at least one sliding hole, and the at least one operating component is connected to the connecting arm.

According to an embodiment of the present invention, the backrest locking mechanism further includes at least one recovering component disposed on the base and abutting against the at least one operating component, and the at least one recovering component is configured to bias the at least one operating component to drive the at least one locking component to slide toward the at least one locking pin.

According to an embodiment of the present invention, the at least one mounting arm includes two mounting arms. The at least one guiding slot includes two guiding slots. The at least one locking pin includes two locking pins. The at least one locking component includes two locking components. The at least one operating component includes two operating components. Each of the two locking components is at least partially located inside a corresponding one of the two guiding slots. Each of the two locking pins is disposed on a corresponding one of the two mounting arms. The at least one recovering component includes one recovering component. The one recovering component is an integral structure, and two ends of the one recovering component respectively abut against the two operating components.

In summary, in the present invention, the locking pin and the locking component of the backrest locking mechanism are respectively disposed on one and another one of the backrest and the base, and the locking hole structure is formed on the locking component and for engaging with the locking pin. Furthermore, the operating component movably disposed on the backrest and the base drives the locking pin and the locking component to engage with or disengage from each other when the operating component is operated. The present invention not only has simple structure and capability of allowing easy and convenient attachment and detachment of the backrest and the base but also makes the attachment of the backrest and the base more reliable.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct electrical/mechanical connection. Thus, if a first device is connected to a second device, that connection may be through a direct electrical/mechanical connection, or through an indirect electrical/mechanical connection via other devices and connections.

The present invention provide a backrest locking mechanism adapted for a base of a child safety seat and a backrest of the child safety seat detachably connected to the base. The backrest locking mechanism includes a locking pin, a locking component and an operating component. The locking pin and the locking component are respectively disposed on one and another one of the backrest and the base. A locking hole structure is formed the locking component and for engaging with the locking pin. The operating is movably disposed on the backrest or the base. The operating component can drive the locking pin and the locking hole structure to engage with or disengage from each other when the operating component is operated. Such configuration not only can make attachment of the backrest and the base more reliable and compact but also makes operation of attachment and detachment of the backrest and the base easier and more convenient. In order to illustrate technical specifications and structural features as well as achieved purposes and effects of the present invention, relevant embodiments and figures are described as follows.

Figure 1:
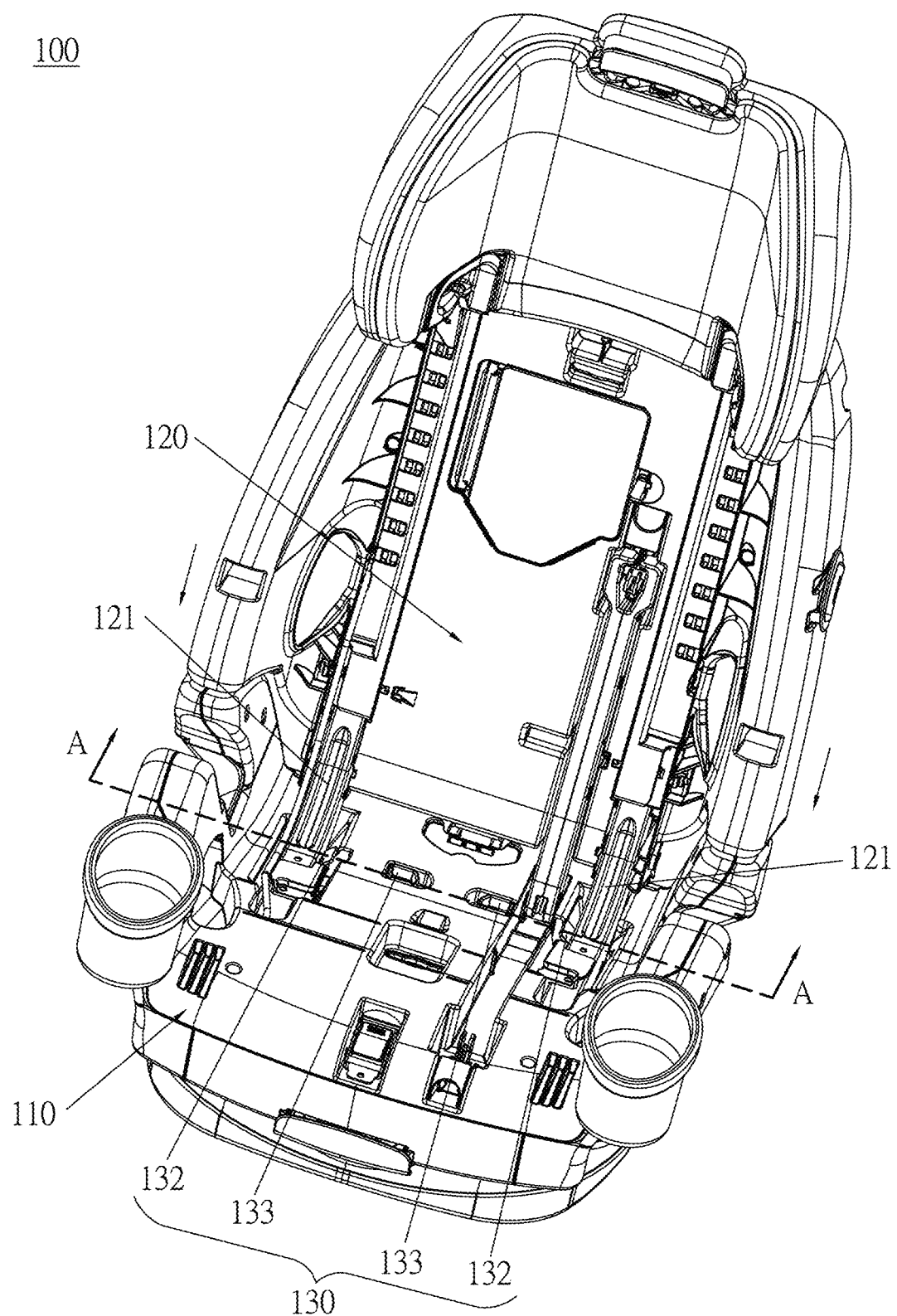
FIG. 1 is a schematic diagram of a child safety seat according to an embodiment of the present invention.
Figure 2:
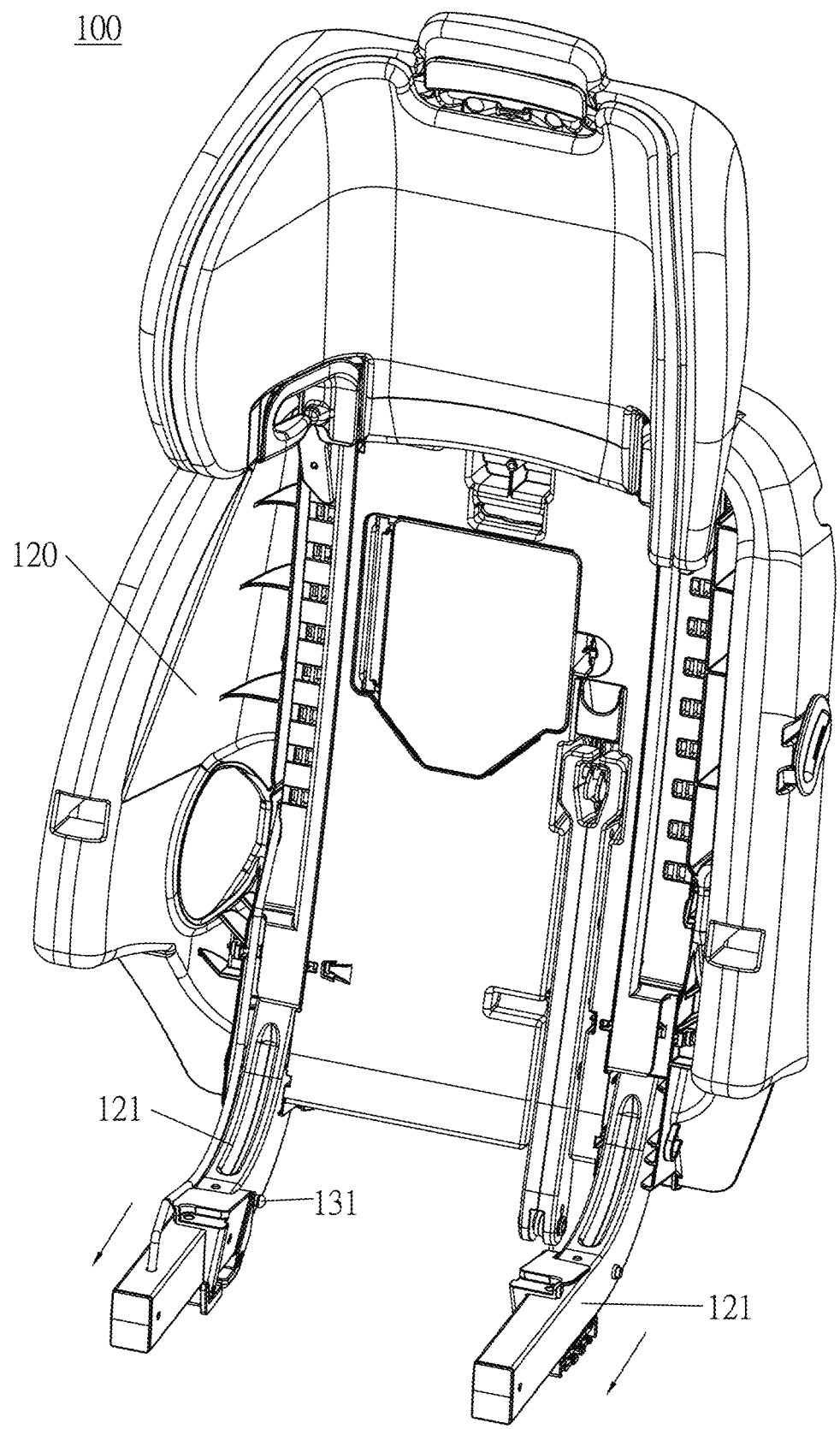
FIG. 2 to FIG. 4 are diagrams of different portions of the child safety seat according to the embodiment of the present invention.
Figure 3:
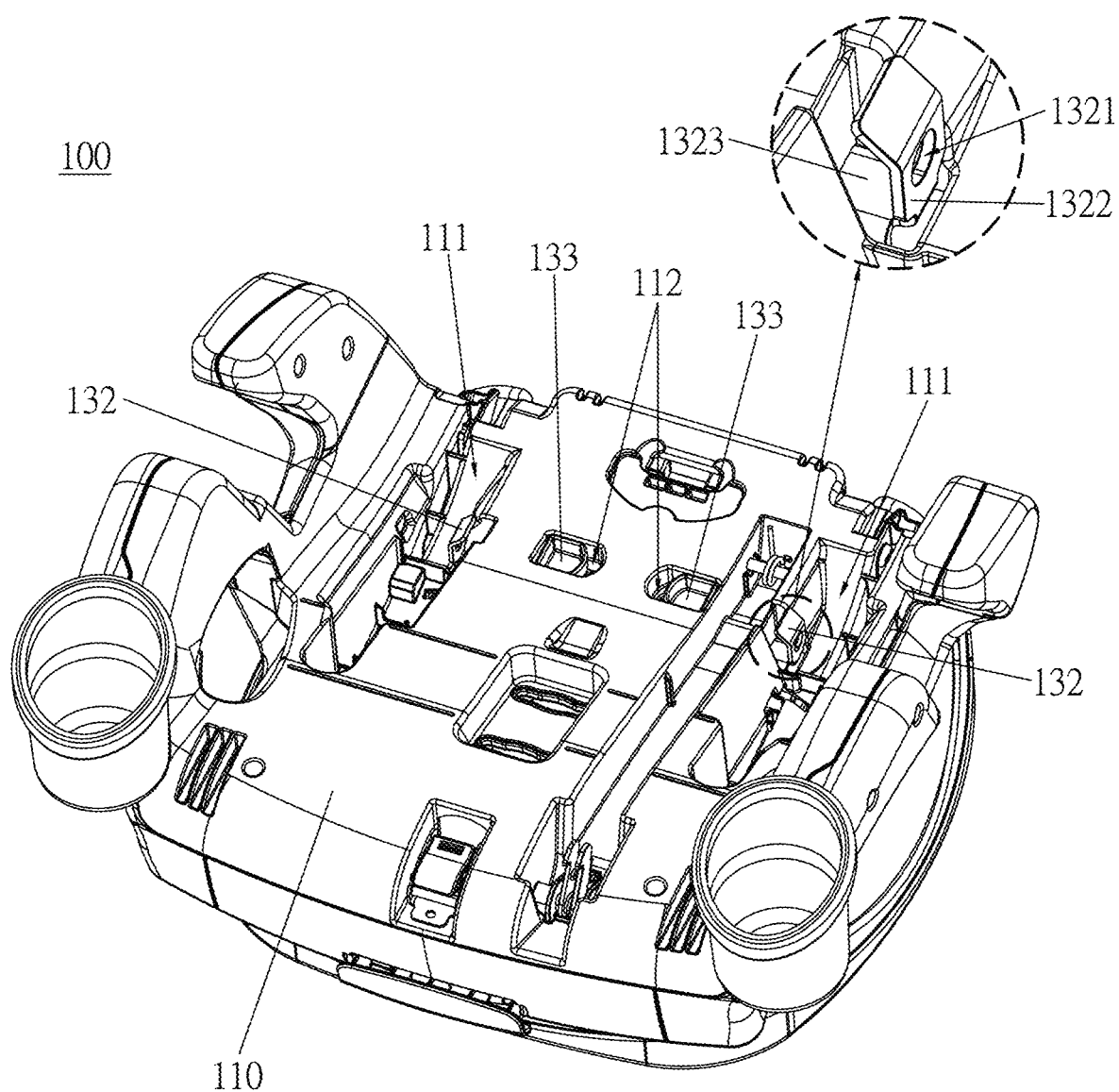
Figure 4:
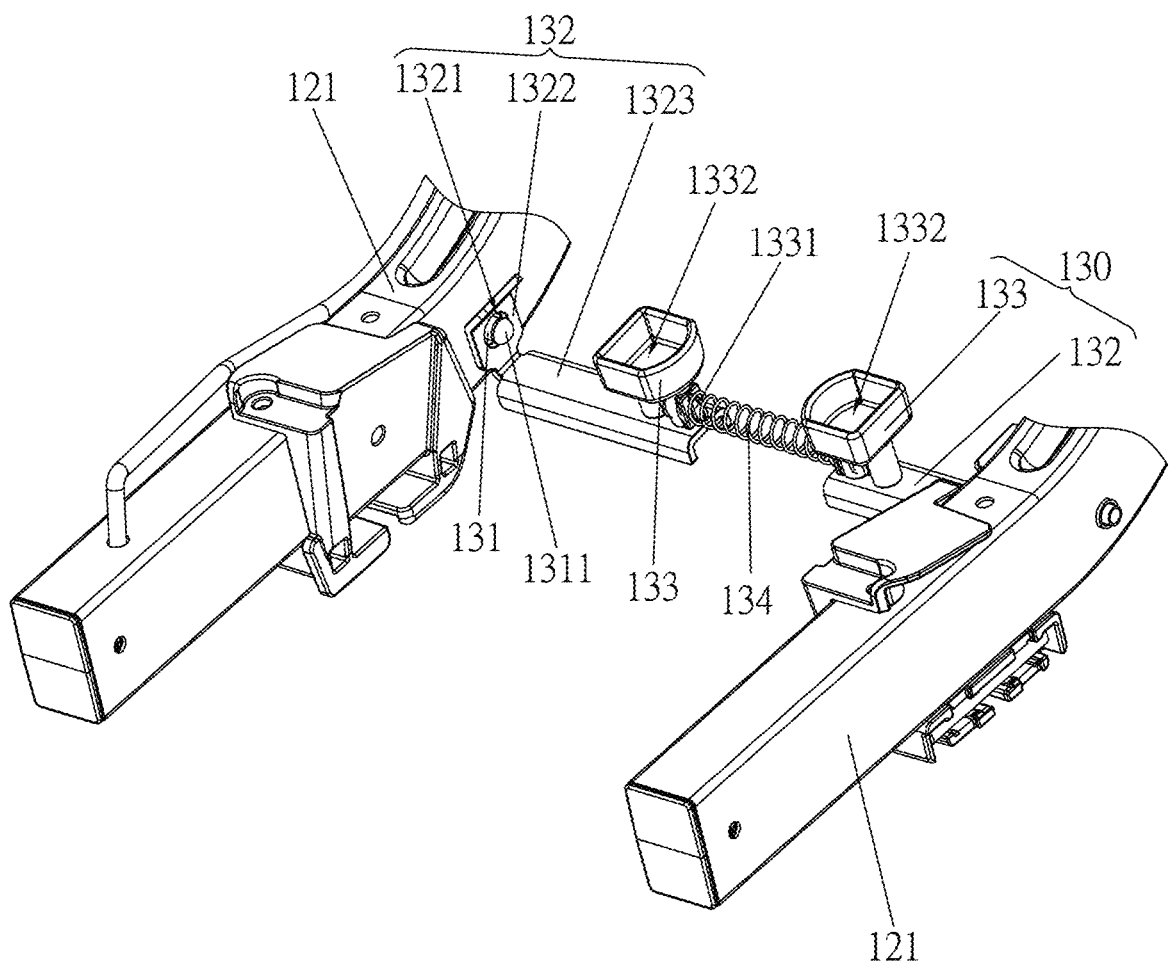

Please refer to FIG. 1 to FIG. 4. FIG. 1 is a schematic diagram of a child safety seat 100 according to an embodiment of the present invention. FIG. 2 to FIG. 4 are diagrams of different portions of the child safety seat 100 according to the embodiment of the present invention. As shown in FIG. 1 to FIG. 4, the child safety seat 100 includes a base 110, a backrest 120 and a backrest locking mechanism 130. The backrest 120 is detachably connected to the base 110 by the backrest locking mechanism 130. The backrest locking mechanism 130 can make the operation of the attachment and detachment of the backrest and the base easier and more convenient.

As shown in FIG. 2 and FIG. 3, two mounting arms 121 protrude from two sides of a lower end of the backrest 120 and are parallel to each other. Two guiding slots 111 are formed on an upper surface of the base 110 and at locations corresponding to the two mounting arms 121. The backrest locking mechanism 130 is partially disposed between each mounting arm 121 and a lateral wall of the corresponding guiding slot 111. The backrest locking mechanism 130 can lock the two mounting arms 121 onto the base 110 for restraining the backrest 120 from being detached from the base 110 when the two mounting arms 121 slide into the two guiding slots 111 respectively. When the backrest locking mechanism 130 is in a releasing state, the backrest 120 is allowed to be detached from the base 110.

Figure 5:
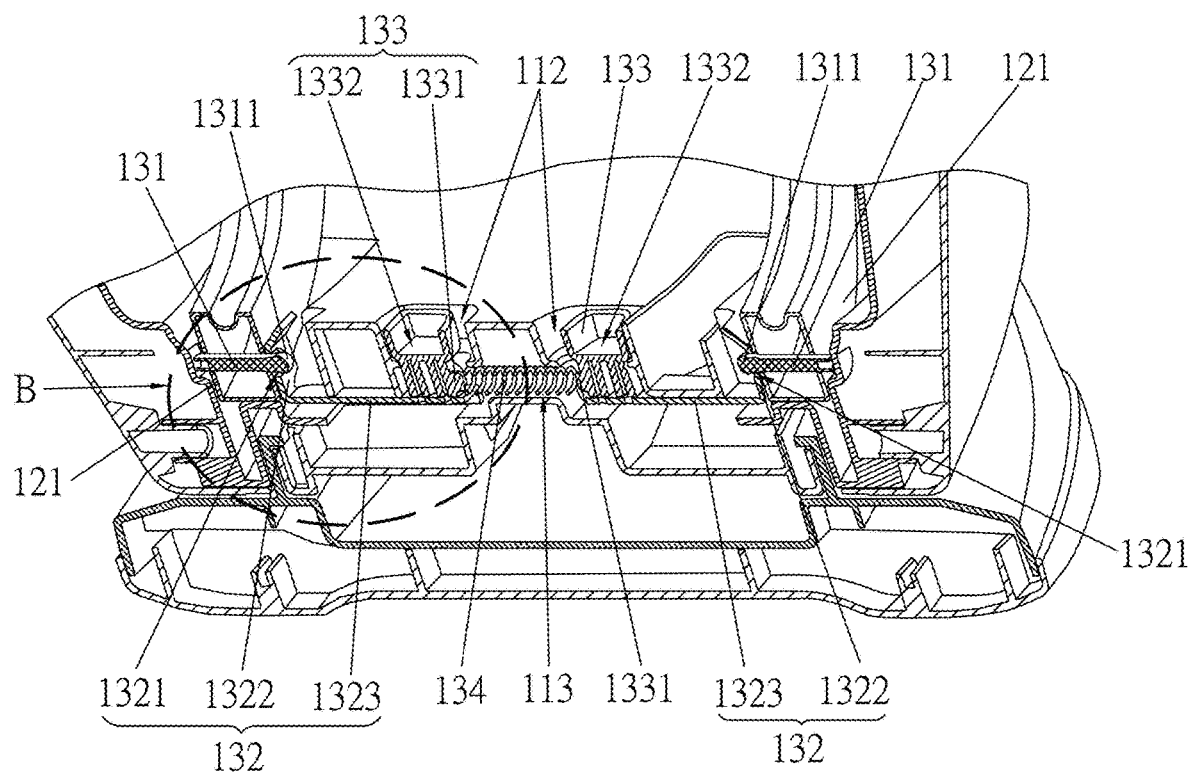
FIG. 5 is a sectional diagram of the child safety seat along an A-A line shown in FIG. 1 according to the embodiment of the present invention.
Figure 6:
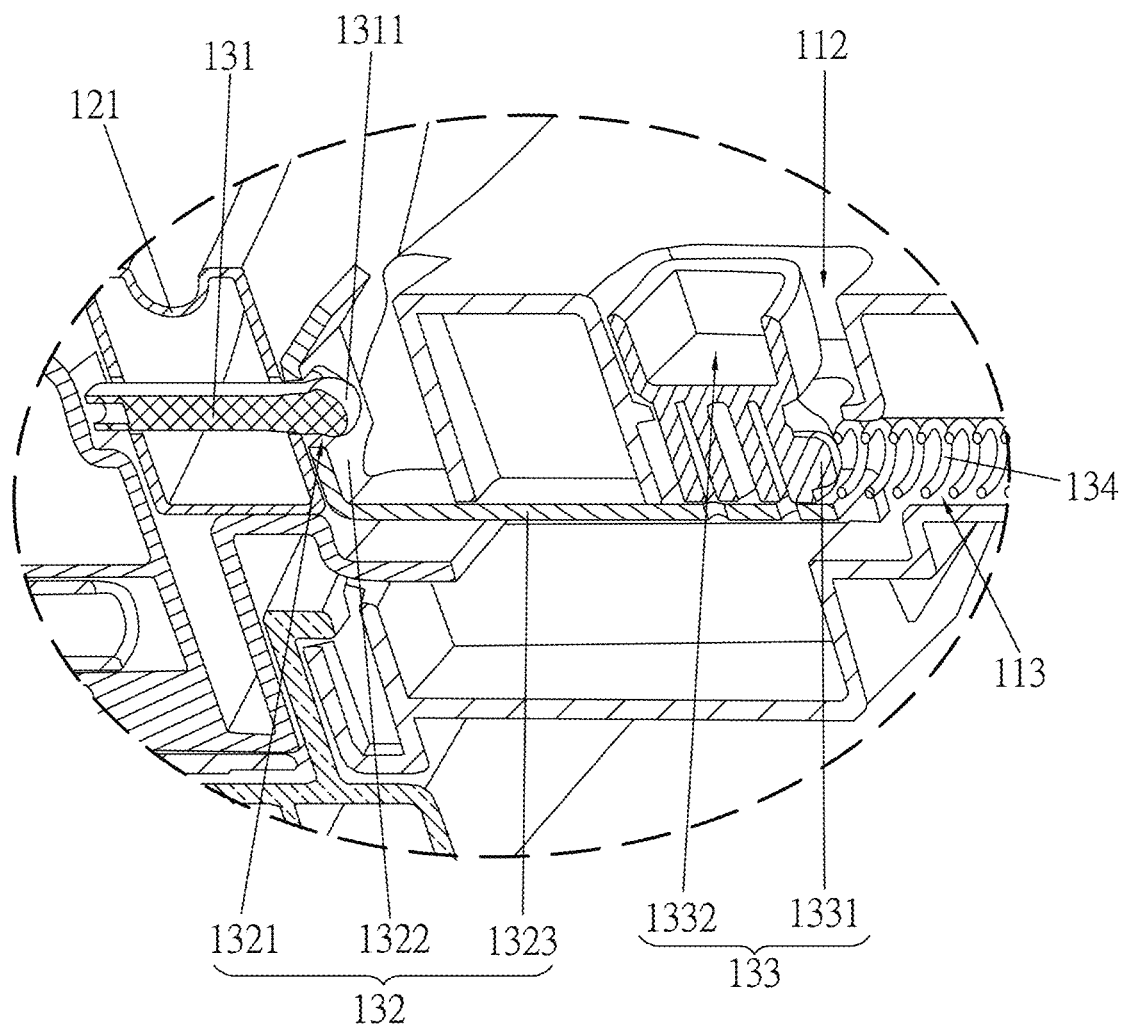
FIG. 6 is a diagram of a B portion of the child safety seat according to the embodiment of the present invention.

Please refer to FIG. 4 to FIG. 6. FIG. 5 is a sectional diagram of the child safety seat 100 along an A-A line shown in FIG. 1 according to the embodiment of the present invention. FIG. 6 is a diagram of a B portion of the child safety seat 100 according to the embodiment of the present invention. As shown in FIG. 4 to FIG. 6, the backrest locking mechanism 130 includes two locking pins 131, two locking components 132 and two operating components 133. Each locking pin 131 is disposed on the corresponding mounting arm 121. Each locking component 132 is disposed on the base 110, and a locking hole structure 1321 is formed on each locking component 132 and corresponding to the corresponding locking pin 131. Each locking component 132 is retractable and extendable. Each operating component 133 is movably disposed on the base 110 and connected to the corresponding locking component 132. When each operating component 133 is forced or operated to move, each operating component 133 can drive the corresponding locking component 132 to drive the corresponding locking pin 131 and the corresponding locking hole structure 1321 to engage with or disengage from each other.

Preferably, in this embodiment, each operating component 133 can be a sliding component. Two sliding holes 112 are formed on the upper surface of the base 110. Each sliding component is slidably disposed inside the corresponding sliding hole 112 and partially exposed out of the base 110 through the corresponding sliding hole 112 for allowing a user to operate easily. Each sliding component is connected to the corresponding locking component 132. When each sliding component slides, each sliding component drives the corresponding locking component 132 to drive the corresponding locking component 132 and the corresponding locking pin 131 to engage with or disengage from each other.

However, the structure of the child safety seat is not limited to this embodiment. For example, in another embodiment, the backrest locking mechanism can include one locking pin at one side of the backrest, one locking component at one side of the base, and one operating component slidably disposed on the base and connected to the locking component, wherein there can be only one sliding hole formed on the base for accommodating the operating component.

Figure 7:
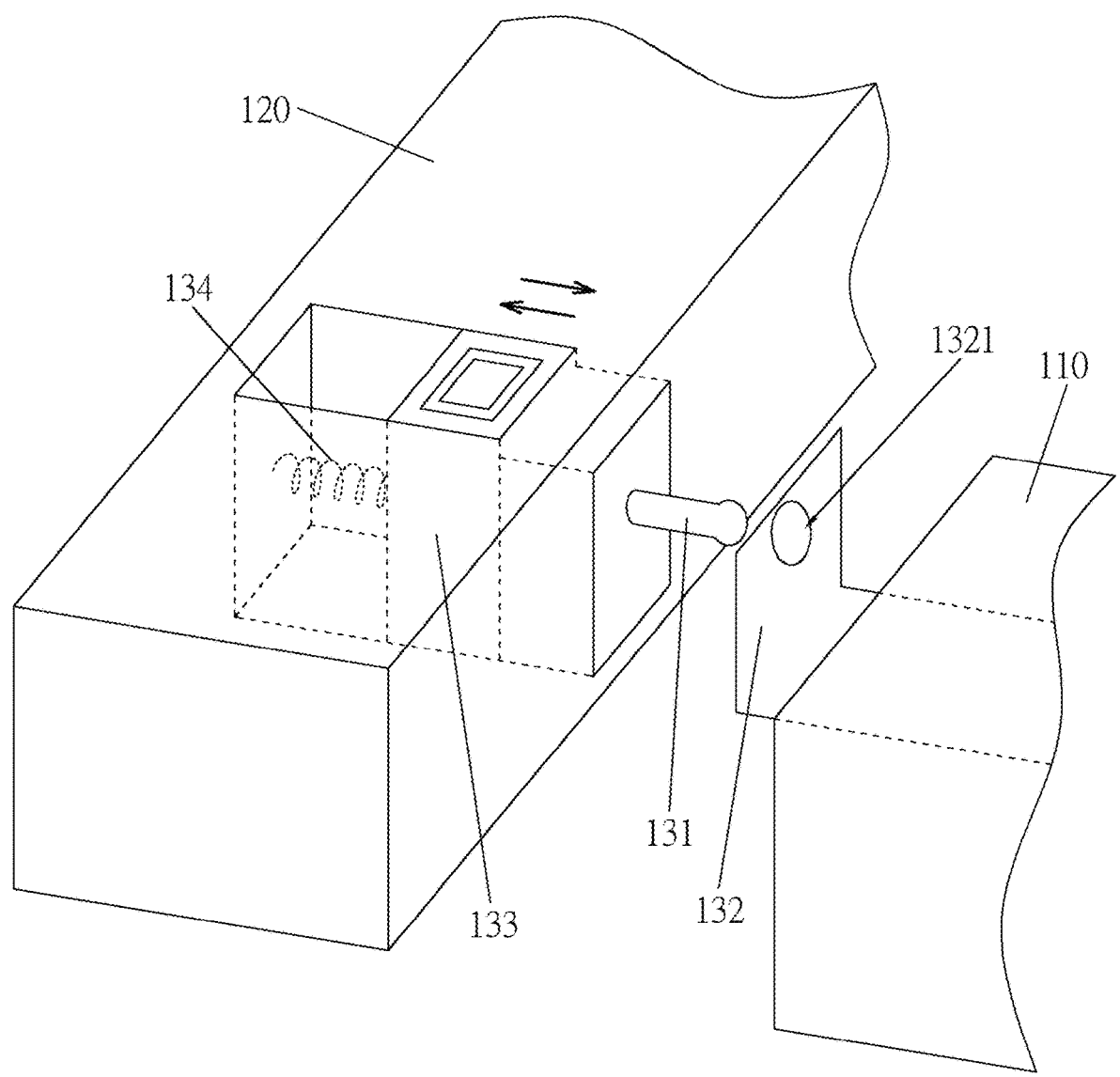
FIG. 7 to FIG. 10 are diagrams of partial structure of a child safety seat according to different embodiments of the present invention.

Furthermore, please refer to FIG. 7 to FIG. 10. FIG. 7 to FIG. 10 are diagrams of partial structure of the child safety seat according to different embodiments of the present invention. As shown in FIG. 7, in this embodiment, the backrest locking mechanism can include one locking pin 131 at one side of the backrest 120, one locking component 132 at one side of the base 110, and one operating component 133 slidably disposed on the backrest 120 and connected to the locking pin 131. The operating component 133 drives the locking pin 131 to retract or extend to drive the locking pin 131 and the locking hole structure 1321 to engage with or disengage from each other when the operating component 133 is operated. That is, the locking pin 131 of this embodiment is retractable and extendable.

Figure 8:
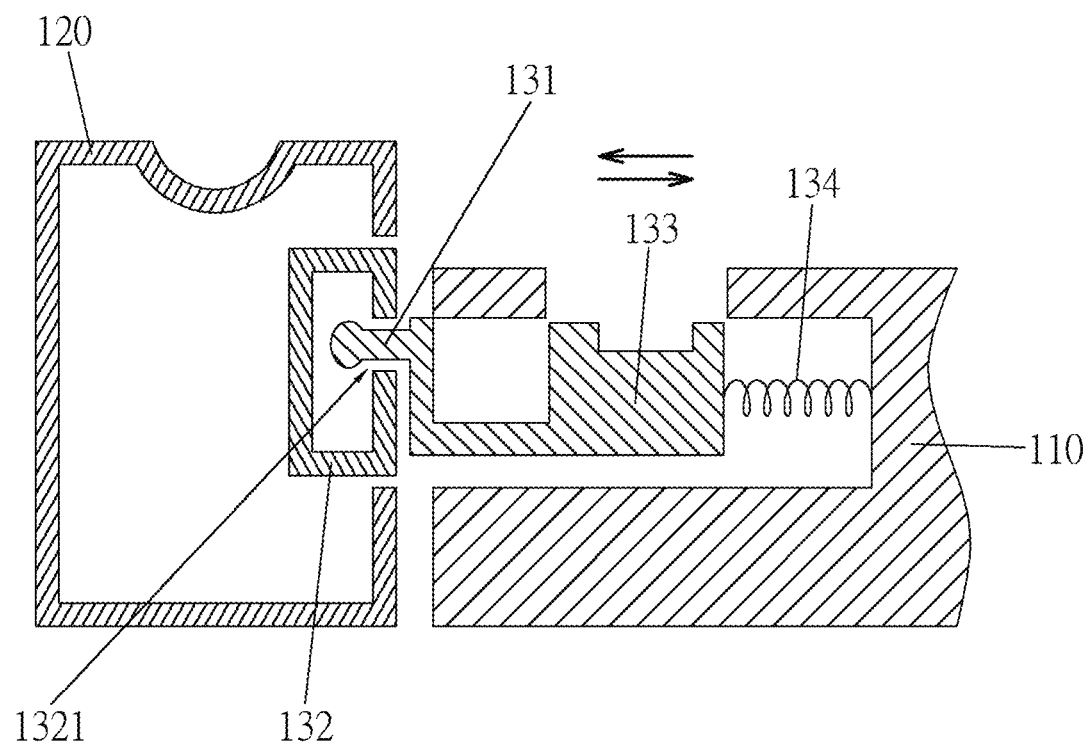

As shown in FIG. 8, in this embodiment, the backrest locking mechanism can include one locking pin 131 at one side of the base 110, one locking component 132 at one side of the backrest 120, and one operating component 133 slidably disposed on the base 110 and connected to the locking pin 131. The operating component 133 drives the locking pin 131 to retract or extend to drive the locking pin 131 and the locking hole structure 1321 to engage with or disengage from each other when the operating component 133 is operated.

Figure 9:
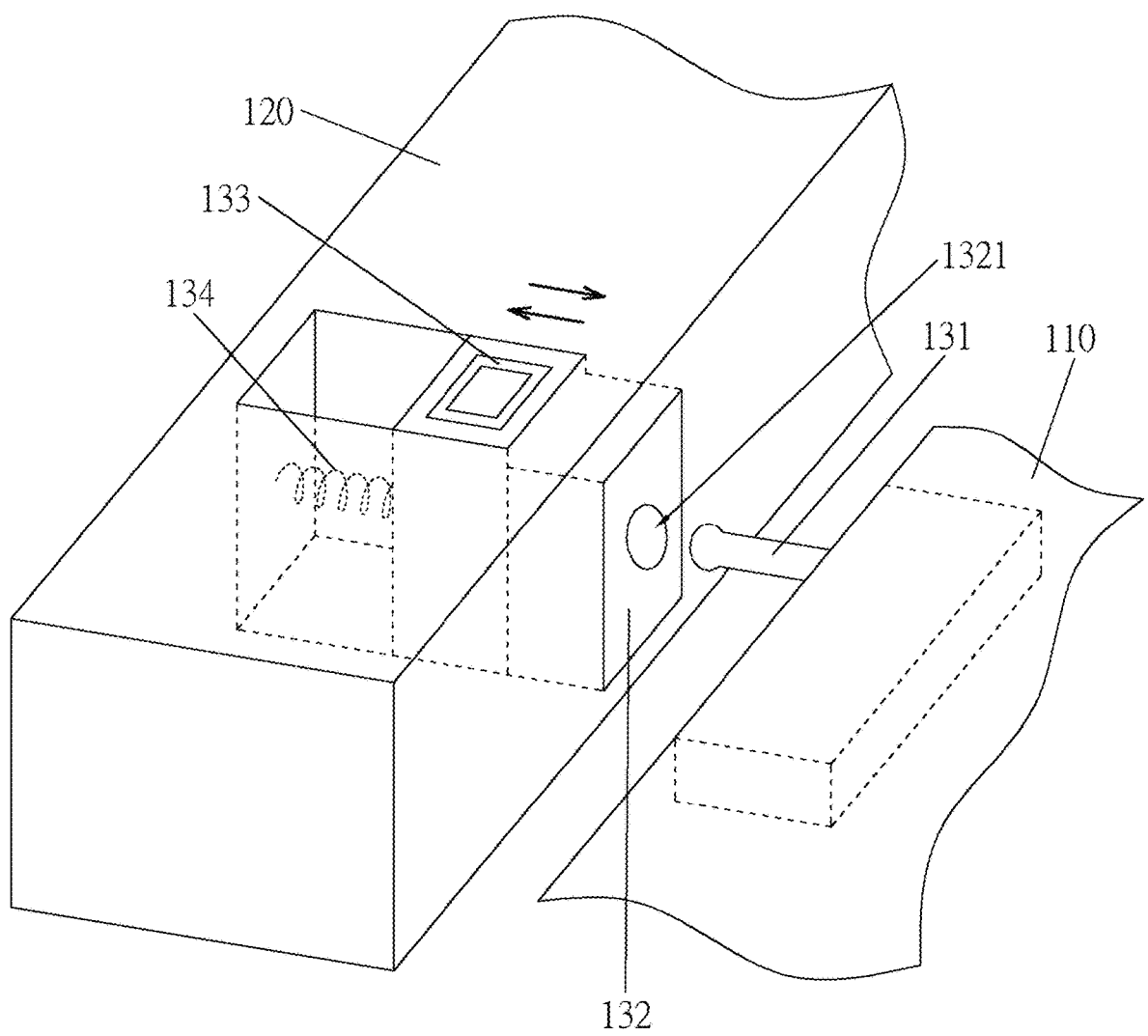

As shown in FIG. 9, in this embodiment, the backrest locking mechanism can include one locking pin 131 at one side of the base 110, one locking component 132 at one side of the backrest 120, and one operating component 133 slidably disposed on the backrest 120 and connected to the locking component 132. The operating component 133 drives the locking component 132 to retract or extend to drive the locking pin 131 and the locking hole structure to engage with or disengage from each other when the operating component 133 is operated.

Figure 10:
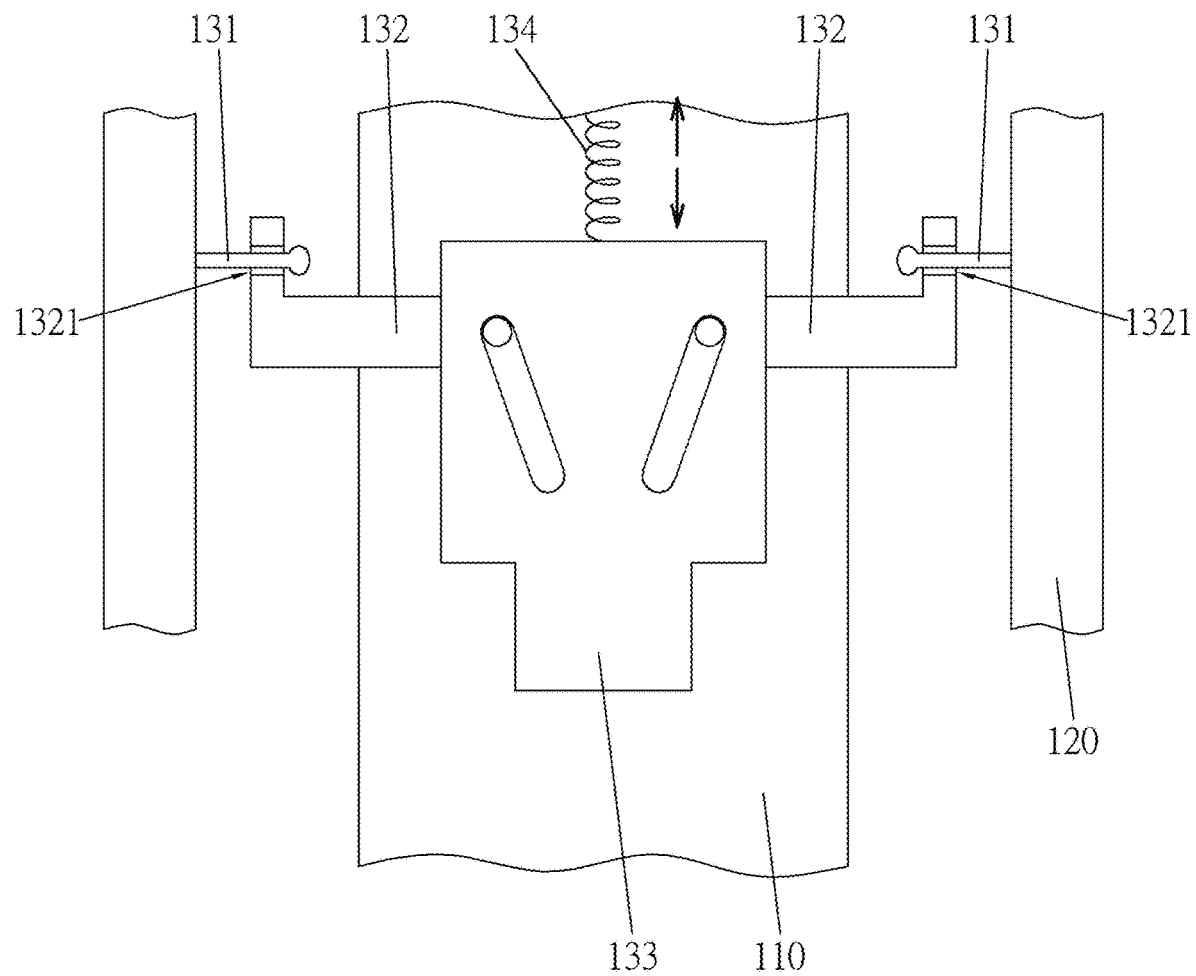

As shown in FIG. 10, in this embodiment, the backrest locking mechanism can include two locking pins 131 at two sides of the backrest 120, two locking components 132 at two sides of the base 110, and one operating component 133 slidably disposed on the base 110 and movably connected to the locking components 132. The operating component 133 drives the two locking components 132 to retract or extend to drive the two locking pins 131 and the two locking hole structures 1321 to engage with or disengage from each other when the operating component 133 is operated.

In another embodiment, there can be only one mounting arm protruding from the backrest and one guiding slot formed on the base. The backrest locking mechanism can include at least one locking pin and at least one locking component respectively disposed on one and the other one of the mounting arm and the guiding slot.

Furthermore, the configuration of the operating component is not limited to the aforementioned embodiments. For example, in another embodiment, the operating component can be a pressing component, such as a pressing button, and a pressing slot is formed on the backrest or the base and corresponding to the pressing component for allowing the pressing component to be pressed. The pressing component can drive the corresponding locking component or the corresponding locking pin to retract or extend to achieve attachment and detachment of the base and the backrest.

In another embodiment, the operating component can be a rotating component. A through hole can be formed on the rotating component for allowing the corresponding locking component or the corresponding locking pin to pass therethrough. A portion of the rotating component is exposed out of the base or the backrest for allowing the user to operate easily. When the rotating component is forced to rotate, the rotating component can drive the corresponding locking component or the corresponding locking pin to retract or extend to achieve attachment and detachment of the base and the backrest.

In another embodiment, the operating component can be a rotating component including a rotating locking portion, a rotating engaging portion and rotating releasing portion. The rotating engaging portion is configured to engage with the rotating locking portion. The rotating releasing portion is configured to drive the rotating engaging portion to move. Therefore, after the rotating component is rotated to drive the corresponding locking component and the corresponding locking pin to disengage from each other, the rotating engaging portion can be operated to engage with the rotating locking portion, so that the corresponding locking component or the corresponding locking pin which is connected to rotating component can be positioned at a releasing position for allowing the user to detach the backrest from the base without continuously operating the rotating component. Furthermore, when the rotating releasing portion is operated to drive the rotating engaging portion to disengage from the rotating locking portion, the rotating component can be recovered to drive the corresponding locking pin and the corresponding locking component to engage with each other.

Furthermore, as shown in FIG. 4, the backrest locking mechanism 130 further includes a recovering component 134 which can cooperate with the two operating components 133. The recovering component 134 is disposed on the base 110 and connected to the two operating components 133. When each operating component 133 is operated to drive the corresponding locking component 132 to disengage the corresponding locking hole structure 1321 from the corresponding locking pin 131, each operated operating component 133 can resiliently deform the recovering component 134. When each operating component 133 is released, the resiliently deformed recovering component 134 can drive each operating component 133 to recover, so as to drive the corresponding locking component 132 to engage the corresponding locking hole structure 1321 with the corresponding locking pin 131.

Preferably, in this embodiment, the recovering component 134 can be a compression spring. However, the present invention is not limited to this embodiment. For example, in another embodiment, the recovering component can be an extension spring, a torsional spring, a leaf spring or any other resilient component which can bias the operating component to recover.

Besides, understandably, the configuration and the number of the recovering component are not limited to this embodiment. It depends on practical demands. For example, in another embodiment, the backrest locking mechanism can include two operating components disposed on the base, and the backrest locking mechanism can further include two recovering components disposed on the base independently and connected to the two operating components respectively, and two ends of each recovering component abut against the corresponding operating component and the base.

In another embodiment, when the backrest locking mechanism includes two operating components disposed on the backrest, the backrest locking mechanism can include one recovering component disposed on the backrest and connected to and located between the two operating components.

In another embodiment, the backrest locking mechanism can include two operating components disposed on the backrest, the backrest locking mechanism can further include two recovering components disposed on the backrest, and two ends of each recovering component abut against the corresponding operating component and the backrest.

In another embodiment, the backrest locking mechanism can include one operating component disposed on the base, the backrest locking mechanism can further include one recovering component disposed on the base and connected to the operating component, and two ends of the recovering component abut against the operating component and the base.

In another embodiment, the backrest locking mechanism can include one operating component disposed on the backrest, the backrest locking mechanism can further include one recovering component disposed on the backrest and connected to the operating component, and two ends of the recovering component abut against the operating component and the backrest.

Specifically, as shown in FIG. 4 to FIG. 6, in this embodiment, each locking pin 131 is fixedly connected to the corresponding mounting arm 121. A protruding end of each locking pin 131 protrudes from a lateral wall of the corresponding mounting arm 121. Each locking component 132 is slidably disposed on the base 110. An end of each locking component 132 whereon the locking hole structure 1321 is formed, is located inside the corresponding guiding slot 111. Each operating component 133 is slidably connected to the base 110 and fixedly connected to the corresponding locking component 132, and a sliding direction of each operating component 133 is parallel to a longitudinal direction of the corresponding locking pin 131. The recovering component 134 is disposed inside the base 110 and abutted between the two operating components 133. Each locking pin 131 and the recovering component 134 are located at two opposite sides of the corresponding operating component 133. Each operating component 133 is slidable between a first position and a second position. When each operating component 133 is located at the first position, the corresponding locking pin 131 and the corresponding locking hole structure 1321 engage with each other. When each operating component 133 slides from the first position to the second position, each operating component 133 drives the corresponding locking component 132 to slide to disengage the corresponding locking hole structure 1321 from the corresponding locking pin 131. The recovering component 134 can bias the two operating components 133 to slide from the second position to the first position to drive the corresponding locking component 132 to slide toward the corresponding locking pin 131.

As shown in FIG. 4 to FIG. 6, each locking component 132 includes a locking plate 1322 and a connecting arm 1323. An included angle is formed between each locking plate 1322 and the corresponding connecting arm 1323. An extending direction of each locking plate 1322 can be substantially perpendicular to the longitudinal direction of the corresponding locking pin 131. Each locking hole structure 1321 is formed on the corresponding locking plate 1322. A fixing hole is formed on an end of each connecting arm 1323 away from the corresponding locking plate 1322. Each connecting arm 1323 is slidably disposed inside the base 110. Each locking plate 1322 is located inside the corresponding guiding slot 111, as shown in FIG. 3. A bottom portion of each operating component 133 is fixedly connected to a connecting component which is fixed onto the fixing hole. Therefore, when each operating component 132 slides, each operating component 133 can drive the corresponding locking component 132 to slide to drive the corresponding locking hole structure 1321 and the corresponding locking pin 131 to engage with or disengage from each other.

Furthermore, the two operating components 133 and the two locking components 132 are slidably disposed between the two mounting arms 121. Correspondingly, the protruding end of each locking pin 131 protrudes from the lateral wall of the corresponding mounting arm 121 which is adjacent to the corresponding operating component 133. However, the configurations of the locking component and the locking pin are not limited to this embodiment.

Besides, a ball head 1311 protrudes from an end of each locking pin 131 adjacent to the corresponding locking component 132, i.e., the ball head 1311 protrudes from the protruding end of each locking pin 131. An outer diameter of each ball head 1311 is greater than an outer diameter of the corresponding locking pin 131 and less than an inner diameter of the corresponding locking hole structure 1321. Each ball head 1311 can guide the corresponding locking pin 131 to engage with the corresponding locking hole structure 1321 easily during a sliding movement of the corresponding mounting arm 121.

As shown in FIG. 4 to FIG. 6, a positioning protrusion 1331 protrudes from a lateral portion of each operating component 133. The recovering component 134 can be arranged along a direction substantially parallel to the sliding direction of the operating component 133, and the two ends of the recovering component 134 sheathe on the positioning protrusions 1331 of the two operating components 133 and abut against the two operating components 133 respectively. When each operating component 133 is forced to slide to the second position, the recovering component 134 is forced to be resiliently deformed. When each operating component 133 is released, the resiliently deformed recovering component 134 can recover to drive each operating component 133 to slide to the first position.

As shown in FIG. 3, FIG. 5 and FIG. 6, an operating recess 1332 is formed on an upper end of each operating component 133. The bottom portion of each operating component 133 is fixedly connected to the corresponding connecting arm 1323. The operating recesses 1332 on the two operating components 133 are exposed out of the upper surface of the base 110 for allowing the user to insert his/her fingers into the two operating recesses 1332 to operate the two operating components 133, which makes operation of the operating component 133 easier and more convenient.

As shown in FIG. 5 to FIG. 6, in this embodiment, an accommodating hole 113 is formed inside the base 110 and communicated with the two sliding holes 112. The recovering component 134 is accommodated inside the accommodating hole 113. The two ends of the recovering component 134 abut against the two operating components 133 respectively. Therefore, the user can insert his/her thumb and forefinger into the operating recesses 1332 of the two operating components 133 to drive the operating components 133 to slide from the first position to the second position and toward a middle portion of the base 110 to pull the two locking components 132 to disengage from the two locking pins 131 for allowing the detachment of the backrest 120 from the base 110.

As shown in FIG. 1 to FIG. 6, operational principle of the backrest locking mechanism 130 of the child safety seat 100 is provided as follows.

When it is desired to assemble the backrest 120 onto the base 110, the two mounting arms 121 of the backrest 120 can be slidably inserted into the two guiding slots 111 on the base 110 forwardly along an arrow direction as shown in FIG. 1 and FIG. 2. Each mounting arm 121 can drive the corresponding locking pin 131 to abut against the corresponding locking plate 1322 and to push the corresponding locking component 132 to slide toward the middle portion of the base 110, so as to drive the corresponding operating component 133 to slide to the second position to compress the recovering component 134 during the forward sliding movement of each mounting arm 121. When each mounting arm 121 slides to a position where the corresponding locking pin 131 is aligned with the corresponding locking hole structure 1321, the resiliently deformed recovering component 134 can drive the corresponding operating component 133 to slide to the first position, so as to drive the corresponding locking component 132 to slide toward the corresponding locking pin 131 to engage the corresponding locking hole structure 1321 with the corresponding locking pin 131 for locking the backrest 120 onto the base 110. Such configuration makes the attachment of the base 110 and the backrest 120 more reliable.

As shown in FIG. 4 to FIG. 6, when it is desired to detach the backrest 120 from the base 110, the user can insert his/her thumb and forefinger into the operating recesses 1332 on the two operating components 133 to drive the two operating components 133 to slide from the first position to the second position and toward the middle portion of the base 110. When the two operating components 133 slide from the first position to the second position, each operating component 133 drives the corresponding locking component 132 to slide to disengage the corresponding locking hole structure 1321 from the corresponding locking pin 131 for allowing the detachment of the backrest 120 from the base 110. During the aforementioned process, the recovering component 134 is compressed to be resiliently deformed. Therefore, when the user releases the two operating components 133, the resiliently deformed recovering component 134 can recover to drive the two operating components 133 to slide from the second position to the first position to drive the two locking components 132 to recover.

Detailed description for other structure of the base 110 and the backrest 120 of the child safety seat 100 is omitted herein for simplicity.

In contrast to the prior art, in the present invention, the locking pin and the locking component of the backrest locking mechanism are respectively disposed on one and another one the backrest and the base, and the locking hole structure is formed on the locking component and for engaging with the locking pin. Furthermore, the operating component movably disposed on the backrest and the base drives the locking pin and the locking component to engage with or disengage from each other when the operating component is operated. The present invention not only has simple structure and capability of allowing easy and convenient attachment and detachment of the backrest and the base but also makes the attachment of the backrest and the base more reliable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backrest locking mechanism adapted for a backrest and a base of a child safety seat, the backrest being detachably connected to the base, at least one mounting arm protruding from a lower end of the backrest, at least one guiding slot being formed on the base, the at least one mounting arm being at least partially accommodated inside the at least one guiding slot and slidable relative to the at least one guiding slot, and the backrest locking mechanism comprising:

a locking pin disposed on the at least one mounting arm;

a locking component partially located inside the at least one guiding slot, a locking hole structure being formed on the locking component, the locking pin being configured to detachably engage with the locking hole structure, the at least one locking pin and the locking hole structure engaging with each other when the at least one mounting arm is at least partially accommodated inside the at least one guiding slot; and an operating component movably disposed on the backrest or the base, the operating component driving the locking pin and the locking hole structure to engage with or disengage from each other when the operating component is operated.

2. The backrest locking mechanism of claim 1, wherein one of the locking component or the locking pin is retractable and extendable.

3. The backrest locking mechanism of claim 2, wherein the operating component is connected to one of the locking component or the locking pin and configured to drive the one of the locking component or the locking pin to retract or extend.

4. The backrest locking mechanism of claim 1, wherein the operating component is a pressing component, a sliding component or a rotating component.

5. The backrest locking mechanism of claim 1, further comprising a recovering component connected to the operating component, the recovering component being resiliently deformed when the operating component is operated, and the resiliently deformed recovering component driving the operating component to recover.

6. The backrest locking mechanism of claim 5, wherein the operating component is slidable between a first position and a second position, the locking pin and the locking hole structure engage with each other when the operating component is located at the first position, the operating component drives the locking pin and the locking hole structure to disengage from each other when the operating component slides from the first position to the second position, and the recovering component biases the operating component to slide from the second position to the first position.

7. The backrest locking mechanism of claim 6, wherein the locking component is fixedly connected to the operating component and slidable together with the operating component, the locking component comprises a locking plate extending along a direction perpendicular to a longitudinal direction of the locking pin, and the locking hole structure is formed on the locking plate.

8. The backrest locking mechanism of claim 7, wherein the locking component further comprises a connecting arm fixedly connected to the locking plate and the operating component for being driven by the operating component, and an included angle is formed between the connecting arm and the locking plate.

9. The backrest locking mechanism of claim 5, wherein a positioning protrusion protrudes from a lateral portion of the operating component, and an end of the recovering component sheathes the positioning protrusion and abuts against the operating component.

10. The backrest locking mechanism of claim 9, wherein a sliding direction of the operating component is parallel to a longitudinal direction of the locking pin, and the recovering component and the locking pin are located at two opposite sides of the operating component.

11. The backrest locking mechanism of claim 1, wherein an operating recess is formed on an end of the operating component exposed out of the backrest or the base.

12. The backrest locking mechanism of claim 1, wherein a ball head protrudes from an end of the locking pin adjacent to the locking component, and an outer diameter of the ball head is greater than an outer diameter of the locking pin.

13. A child safety seat comprising:
a base, at least one guiding slot being formed on the base;
a backrest detachably connected to the base, at least one mounting arm protruding from a lower end of the backrest, and the at least one mounting arm being at least partially accommodated inside the at least one guiding slot and slidable relative to the at least one guiding slot;
a backrest locking mechanism comprising:
at least one locking pin disposed on the at least one mounting arm;
at least one locking component partially located inside the at least one guiding slot, a locking hole structure being formed on the at least one locking component, the at least one locking pin being configured to detachably engage with the locking hole structure, and the at least one locking pin and the locking hole structure engaging with each other when the at least one mounting arm is at least partially accommodated inside the at least one guiding slot;
at least one operating component movably disposed on the backrest or the base, the at least one operating component driving the at least one locking pin and the locking hole structure to engage with or disengage from each other when the at least one operating component is operated.

14. The child safety seat of claim 13, wherein the at least one locking component comprises a connecting arm and a locking plate connected to the connecting arm, an included angle is formed between the connecting arm and the locking plate, the connecting arm is slidably disposed on the base, the locking plate is located inside the at least one guiding slot, the locking hole structure is formed on the locking plate, and the at least one locking pin is fixedly connected to the at least one mounting arm and protrudes from a lateral wall of the at least one mounting arm for engaging with the locking hole structure.

15. The child safety seat of claim 14, wherein at least one sliding hole is formed on the base, the at least one operating component is at least partially accommodated inside the at least one sliding hole and slidable relative to the at least one sliding hole, and the at least one operating component is connected to the connecting arm.

16. The child safety seat of claim 14, wherein the backrest locking mechanism further comprises at least one recovering component disposed on the base and abutting against the at least one operating component, and the at least one recovering component is configured to bias the at least one operating component to drive the at least one locking component to slide toward the at least one locking pin.

17. The child safety seat of claim 16, wherein the at least one mounting arm comprises two mounting arms, the at least one guiding slot comprises two guiding slots, the at least one locking pin comprises two locking pins, the at least one locking component comprises two locking components, the at least one operating component comprises two operating components, each of the two locking components is at least partially located inside a corresponding one of the two guiding slots, each of the two locking pins is disposed on a corresponding one of the two mounting arms, the at least one recovering component comprises one recovering component, the one recovering component is an integral structure, and two ends of the one recovering component respectively abut against the two operating components.

\* \* \* \* \*